(12) United States Patent
Guo et al.

(10) Patent No.: US 8,423,544 B2
(45) Date of Patent: Apr. 16, 2013

(54) HOTSPOT ANALYSIS SYSTEMS AND METHODS

(75) Inventors: Jacob Guo, Dajia Township, Taichung County (TW); Hanwen Chang, Kaohsiung (TW); Yu-Chin Tai, Taipei (TW); Hsiaowei Chen, Bade (TW); Jane Yung-jen Hsu, Taipei (TW)

(73) Assignee: Institute for Information Industry, Taipei (TW)

( * ) Notice: Subject to any disclaimer, the term of this patent is extended or adjusted under 35 U.S.C. 154(b) by 386 days.

(21) Appl. No.: 12/492,358

(22) Filed: Jun. 26, 2009

(65) Prior Publication Data
US 2010/0257168 A1 Oct. 7, 2010

(30) Foreign Application Priority Data
Apr. 7, 2009 (TW) .............................. 98111472 A

(51) Int. Cl.
*G06F 7/00* (2006.01)
*G06F 17/30* (2006.01)

(52) U.S. Cl.
USPC ........................................................ 707/736

(58) Field of Classification Search .............. 707/737
See application file for complete search history.

(56) References Cited

U.S. PATENT DOCUMENTS
| | | | |
|---|---|---|---|
| 7,076,503 B2 * | 7/2006 | Platt et al. ............................ | 1/1 |
| 2003/0009469 A1 | 1/2003 | Platt et al. | |
| 2004/0177109 A1 | 9/2004 | Lee | |

FOREIGN PATENT DOCUMENTS
| | | |
|---|---|---|
| TW | I224743 | 12/2004 |
| TW | 200737023 | 10/2007 |

* cited by examiner

*Primary Examiner* — Usmaan Saeed
*Assistant Examiner* — Paul Kim
(74) *Attorney, Agent, or Firm* — Birch, Stewart, Kolasch & Birch, LLP

(57) ABSTRACT

Hotspot analysis systems and methods are provided. The hotspot analysis system includes a database, a filtering module, a clustering module, and an analysis module. The database includes a plurality of records, each including context information having at least time information and position information. The filtering module filters the records according to current context information to obtain a plurality of filtered records. The clustering module clusters the filtered records into at least one hotspot cluster according to the position information of the filtered records, and generates a hotspot area for each hotspot cluster. The analysis module calculates integral hotness for each hotspot cluster according to the number of the filtered records in the hotspot cluster and the size of the hotspot area of the hotspot cluster, and generates at least hotspot area information according to the integral hotness and the hotspot area of each hotspot cluster.

17 Claims, 5 Drawing Sheets

HOTSPOT ANALYSIS SYSTEMS AND METHODS

CROSS REFERENCE TO RELATED APPLICATIONS

This Application claims priority of Taiwan Patent Application No. 098111472, filed on Apr. 7, 2009, the entirety of which is incorporated by reference herein.

BACKGROUND OF THE INVENTION

1. Field of the Invention

The disclosure relates generally to hotspot analysis systems and methods, and, more particularly to the hotspot analysis systems and methods according to the requirements, thus to assist users to make related decisions.

2. Description of the Related Art

Due to flexibility and convenience of taxis, taxis are important transportation in urban cities. Currently, a passenger may call a taxi management center for taxi services, and then various procedures, devices and mechanisms are implemented in the taxi management center to select and dispatch a specific taxi to a location that the passenger appointed.

For example, US Patent Application No. 20040177109 discloses a central control office which implements connection services between passengers and taxis for taxiing by a communication network. Additionally, Taiwan Patent No. 1224743 discloses an automatic dispatch module, which selects and dispatches a taxi according to a dispatching rule and the passenger's location.

Generally, conventional arts focus on improving taxi calling procedures, taxi selection and dispatch methods, however, issues of loading rate of taxi and time for users to wait a taxi are not addressed. In some cases, when a user located at an outlying area, or many other users at the same area where the user located also need taxi services simultaneously, the average waiting time for the respective users may be lengthened since a limited number of taxies may existed in the area, thus resulting in inconvenient and displeasure for users. On the other hand, if too many taxis simultaneously exist in an area, the rate of unoccupied taxies may be increased, such that the average earnings of taxis are reduced, and the working costs for taxis are increased. Therefore, the application is dedicated to provide an effective solution of hotspot analysis. For example, the application can be implemented in taxi service to analyze hotspots for loading customers, thus providing the hotspots to improve the loading rate of taxi and reduce the waiting time for customers. In the application, the working costs of taxis can be substantially reduced, and the economic benefits can be raised.

BRIEF SUMMARY OF THE INVENTION

Hotspot analysis systems and methods are provided. In some embodiments, the application can be used for analyzing hotspots as part of a taxi calling service. However, the application can be also applied in various applications, such as hotspot analysis for travel locations, restaurants, parking lots, car flow, and others.

An embodiment of a hotspot analysis system includes a database, a filtering module, a clustering module, and an analysis module. The database includes a plurality of records, each including context information having at least time information and position information. The filtering module filters the records according to current context information to obtain a plurality of filtered records. The current context information includes at least current time information. The clustering module clusters the filtered records into at least one hotspot cluster according to the position information of the filtered records, and generates a hotspot area for each hotspot cluster. The analysis module calculates integral hotness for each hotspot cluster according to the number of the filtered records in the hotspot cluster and the size of the hotspot area of the hotspot cluster. The analysis module generates at least hotspot area information according to the integral hotness and the hotspot area of each hotspot cluster.

In an embodiment of a hotspot analysis method, a database is provided. The database includes a plurality of records, each including context information having at least time information and position information. Current context information is obtained, wherein the current context information includes at least current time information. The records are filtered according to the current context information to obtain a plurality of filtered records. The filtered records are clustered into at least one hotspot cluster according to the position information of the filtered records, and a hotspot area is generated for each hotspot cluster. Then, integral hotness is calculated for each hotspot cluster according to the number of the filtered records in the hotspot cluster and the size of the hotspot area of the hotspot cluster, and at least hotspot area information is generated and provided according to the integral hotness and the hotspot area of each hotspot cluster.

In some embodiments, the respective hotspot clusters and/or the corresponding hotspot areas can be named according to the position information of the filtered records in the respective hotspot clusters.

In some embodiments, relative hotness is calculated for each hotspot cluster according to the integral hotness of the respective hotspot clusters and a distance between the respective hotspot clusters and current position information of the current context information. Additionally, in some embodiments, real-time hotness is calculated for each hotspot cluster according to the relative hotness of the respective hotspot clusters, a number of devices in the hotspot area of the hotspot cluster, and/or events and the number of corresponding participants of the events occurring in the hotspot area of the hotspot cluster.

Hotspot analysis systems and methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Hotspot analysis systems and methods are provided.

Figure 1:
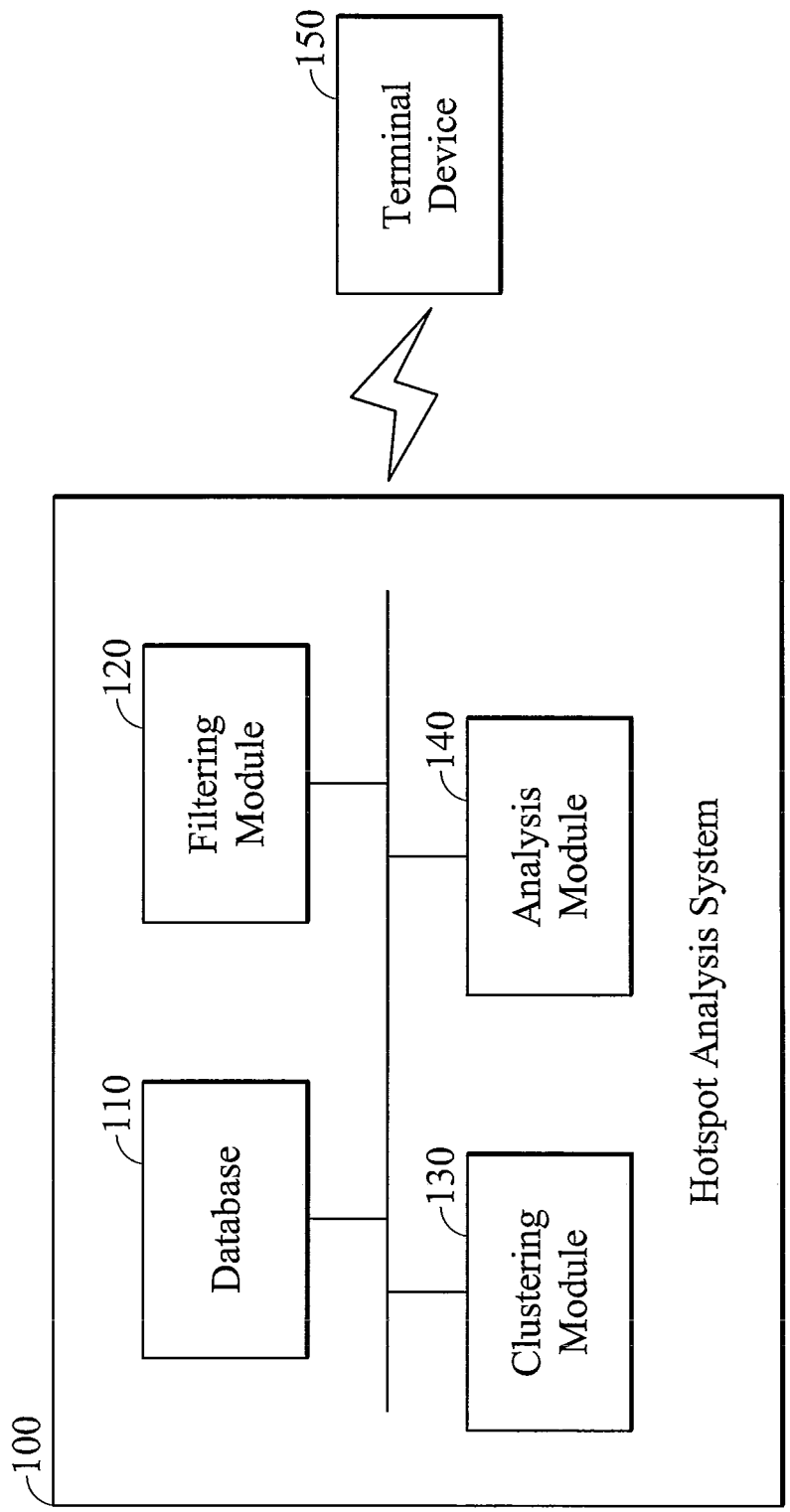
FIG. 1 is a schematic diagram illustrating an embodiment of a hotspot analysis system of the invention.

FIG. 1 is a schematic diagram illustrating an embodiment of a hotspot analysis system of the invention. The hotspot analysis system 100 can be used in an electronic device, such as a server, a workstation, a KIOSK, a computer, a notebook, a handheld computer, an industrial computer, a PDA, a smart phone, a GPS device, or a terminal device which can provide calculation abilities.

The hotspot analysis system 100 includes a database 110, a filtering module 120, a clustering module 130, and an analysis module 140. The database 110 comprises a plurality of records, such as taxi-taking records. It is noted that, no matter a passenger calls to a taxi company to ask a taxi, or a passenger stops a taxi at roadside, a taxi-taking record can be accordingly generated. Each record comprises context information, such as time information, position information, and/or weather information. It is noted that, the records can be transmitted from a remote database (not shown in FIG. 1) or a terminal device 150 to the database 110 via a communication network, and thus stored in the database 110. The terminal device 150 may be a movable device. In some embodiments, the system 100 may further comprise an operational interface used to input the context information.

The filtering module 120 can obtain current context information. Similarly, the current context information may comprise current time information, current position information, and/or current weather information. In some embodiments, the current context information can be received via a communication network and the terminal device 150, such as a movable device. The terminal device 150 may have a positioning module (not shown in FIG. 1) to communicate with a positioning system via the communication network, thus to generate position information of the terminal device 150, wherein the generated position information can be set as the current position information in the current context information. The terminal device 150 may further have a time module to generate the current time information in the current context information. In some embodiments, the terminal device 150 can be in a transportation vehicle, such as a taxi. In some embodiments, the hotspot analysis system 100 may have a time module and a positioning module to respectively generate the current time information and the current position information in the current context information. The filtering module 120 can filter the records in the database 110 according to the current context information to obtain a plurality of filtered records. In some embodiments, the hotspot analysis system 100 may further comprise a time model (not shown in FIG. 1). The time model can record a semantic structure for time, such as a plurality of time sections, definitions of a beginning time point and an end time point for each time section, the sequence relationships among the respective time sections, and the coverage relationships among the respective time sections. The filtering module 120 can filter the records according to the current context information and the time model to obtain the filtered records. Related details are discussed later.

The clustering module 130 can cluster the filtered records into at least one hotspot cluster. In some embodiments, the clustering module 130 can use a clustering algorithm, such as a hierarchical agglomerative clustering algorithm, to cluster the filtered records according to the current position information and the position information of the filtered records, and generate a hotspot area for each hotspot cluster. The generation of the hotspot area can be implemented in various manners. For example, in some embodiments, an area range that covers all hotspots in one hotspot cluster can be calculated as the hotspot area according to the positions of the respective hotspots in the hotspot cluster. In some embodiments, the positions of the outermost hotspots in the hotspot cluster are connected to obtain an area range as the hotspot area. In some embodiments, the positions of the hotspots in the hotspot cluster are compared with physical geographic areas (or administration districts, or areas containing specific landmarks/buildings/road sections) to determine a specific physical geographic area (or administration district, or area containing specific landmarks/buildings/road sections) as the hotspot area, wherein the positions of the hotspots fall within or is close to the specific physical geographic area.

The analysis module 140 can calculate at least hotness for each hotspot cluster according to the number of the filtered records in the hotspot cluster, the size of the hotspot area of the hotspot cluster, a distance between the respective hotspot clusters and the terminal device 150, a number of movable devices in the hotspot area of the hotspot cluster, and/or events and the number of corresponding participants of the events occurring in the hotspot area of the hotspot cluster, and generate at least hotspot area information according to the hotness and the hotspot area of each hotspot cluster. In some embodiments, the analysis module 140 can rank the hotspot clusters according to the hotness of the respective hotspot clusters to obtain at least one recommended hotspot cluster, and thus generate the hotspot area information for the recommended hotspot cluster. In some embodiments, the analysis module 140 can display the hotspot area information for all or part of the hotspot clusters and/or the hotspot area information for the recommended hotspot cluster in an operational interface (not shown). In some embodiments, the analysis module 140 can further transmit the hotspot area information for all or part of the hotspot clusters and/or the hotspot area information for the recommended hotspot cluster to the terminal device 150 via the communication network. The terminal device 150 may have an electronic map function, and display the hotspot area information using the electronic map function.

In some embodiments, the hotspot analysis system 100 may further comprise a naming module and a location model (not shown). The location model records a semantic structure for location, such as a plurality of location units, and related definitions thereof. The location units may be intersections, road sections, scenic spots, and/or landmarks. The location model further records the connection relationships for location sections. The naming module can name the hotspot cluster and/or the corresponding hotspot area according to the location model and the position information of the respective filtered records in the hotspot cluster. Related details are discussed later.

It is understood that, in some embodiments, the filtering module 120, the clustering module 130, the analysis module 140, and/or the naming module of the hotspot analysis system 100 can be implemented using software and/or hardware, and executed by a processing unit of the electronic device. In some embodiments, the filtering module 120, the clustering module 130, the analysis module 140, and/or the naming module may be dependent electronic devices, and interact with each other via signal communication.

Figure 2:
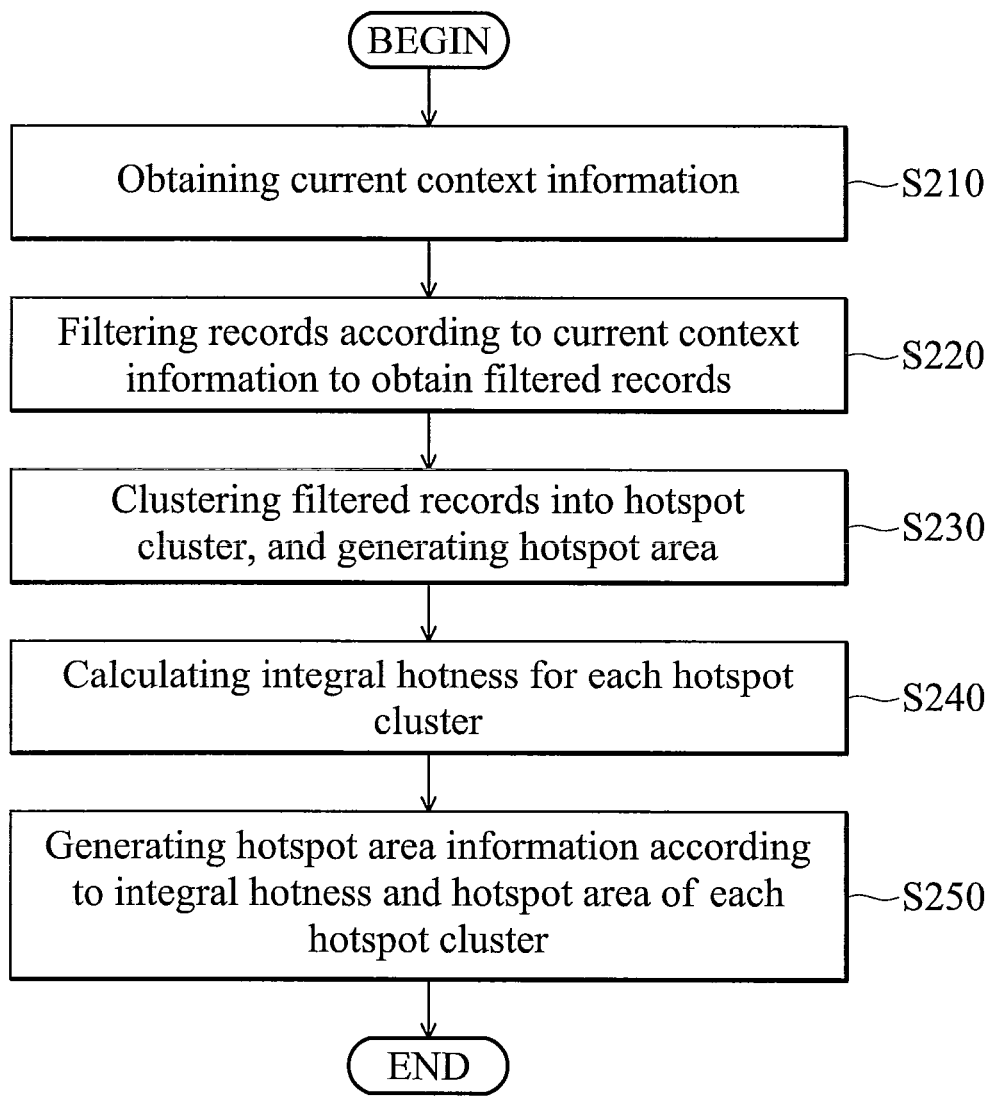
FIG. 2 is a flowchart of an embodiment of a hotspot analysis method of the invention.

FIG. 2 is a flowchart of an embodiment of a hotspot analysis method of the invention. The hotspot analysis method can be used in an electronic device. In step S210, the current context information is obtained. It is noted that, in some embodiments, the current context information can be generated by the electronic device or received from a terminal device. The current context information may comprise time information, position information, and/or weather information. In step S220, the records in the database are filtered according to the current context information to obtain filtered records. Similarly, each filtered record may comprise context information, such as time information, position information, and/or weather information.

Figure 3:
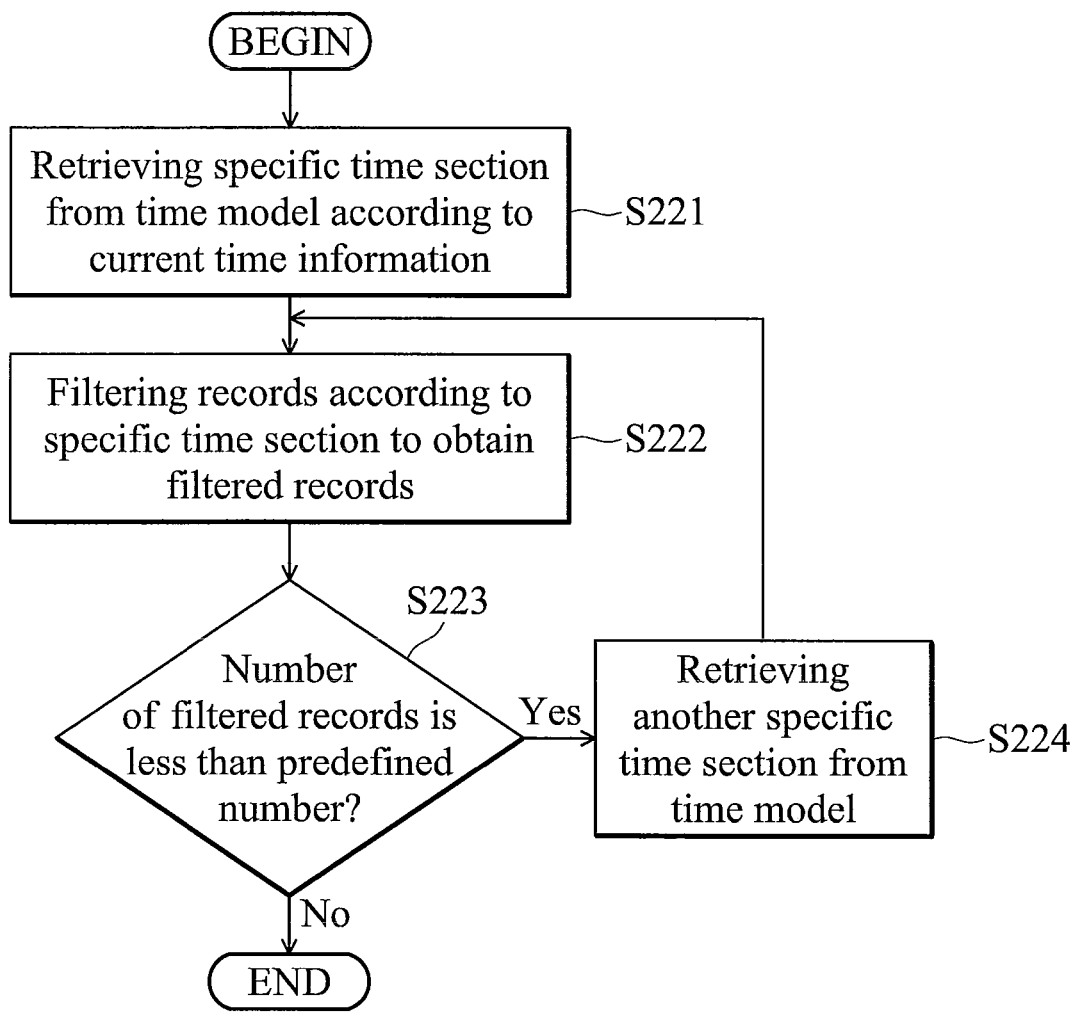
FIG. 3 is a flowchart of an embodiment of a hotspot filtering method of the invention.

FIG. 3 is a flowchart of an embodiment of a hotspot filtering method of the invention. In step S221, a specific time section is retrieved from the time model according to the current time information. As described, the time model can record semantic structures for time, such as a plurality of time sections, definitions of a beginning time point and an end time point for each time section, the sequence relationships among the respective time sections, and the coverage relationships among the respective time sections. Each time point may correspond to at least one time section. For example, the time point of 8:20 AM on Monday may correspond to the time section of 8:00-9:00 AM on Monday, the time section of 8:00-9:00 AM on Monday may correspond to the time section of rush hour at morning on Monday, the time section of rush hour at morning on Monday may correspond to the time sections of rush hour of weekdays, the time section of rush hour at morning on Monday may also correspond to the time section of morning on Monday, the time section of morning on Monday may correspond to the time sections of morning of weekdays, the time section of morning on Monday may also correspond to all time sections on Monday, and all time sections on Monday may correspond to all time sections of weekdays. It is understood that, the semantic structure for time may be adjusted according to various requirements, and the invention is not limited thereto. In step S222, the records in the database are filtered according to the retrieved specific time section to obtain the filtered records, wherein the context information, such as time information of each filtered record is within the specific time section. In step S223, it is determined whether the number of the filtered records is less than a predefined number, such as 300 or other appropriate number. If the number of the filtered records is not less than the predefined number (No in step S223), the procedure is completed. If the number of the filtered records is less than the predefined number (Yes in step S223), in step S224, another specific time section is retrieved from the time model. It is noted that, the purpose of retrieving another specific time section is to loosen the limitation of filtering. That is, the time covered by the new retrieved time section is much longer than the time covered by the old retrieved time section. For example, when the current time is 8:20 AM on Monday, and the first specific time section retrieved from the time model is the time section of 8:00-9:00 AM on Monday, the second specific time section retrieved from the time model may be the time section of rush hour at morning on Monday. After another specific time section is retrieved, the procedure returns to step S222, the records in the database are filtered according to the retrieved time section to obtain filtered records. It is noted that, in some embodiments, the current weather information in the current context information can be further used to filter the records. Then, in step S230, the filtered records are clustered into at least one hotspot cluster using a clustering algorithm, according to the current position information and the position information of the filtered records, and a corresponding hotspot area is generated for each hotspot cluster.

Figure 4:
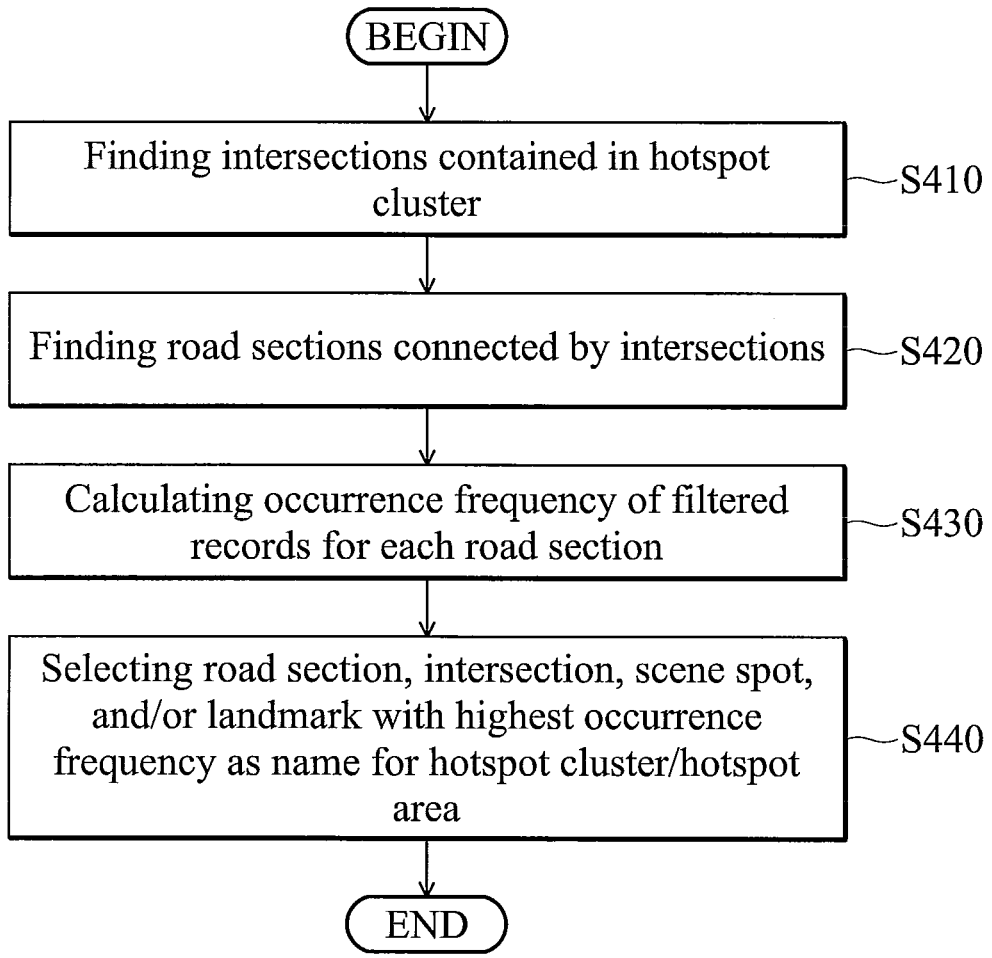
FIG. 4 is a flowchart of an embodiment of a hotspot clustering/naming method of the invention.

As described, each hotspot cluster can be named. FIG. 4 is a flowchart of an embodiment of a hotspot clustering/naming method of the invention. In step S410, the intersections contained in the hotspot cluster are found according to the location model and the context information of the filtered records in the hotspot cluster. Similarly, the location model records a semantic structure for location, such as a plurality of location units, such as intersections, road sections, scenic spots, and/or landmarks, and related definitions thereof, and the connection relationships for road sections. After the intersections are found, in step S420, the road sections connected by the intersections are found according to the location model. In step S430, an occurrence frequency of the filtered records is calculated for each road section according to the position information of the respective filtered records. In step S440, the road section, intersection, scene spot, and/or landmark with the highest occurrence frequency are selected as the name for the hotspot cluster and/or the corresponding hotspot area.

Figure 5:
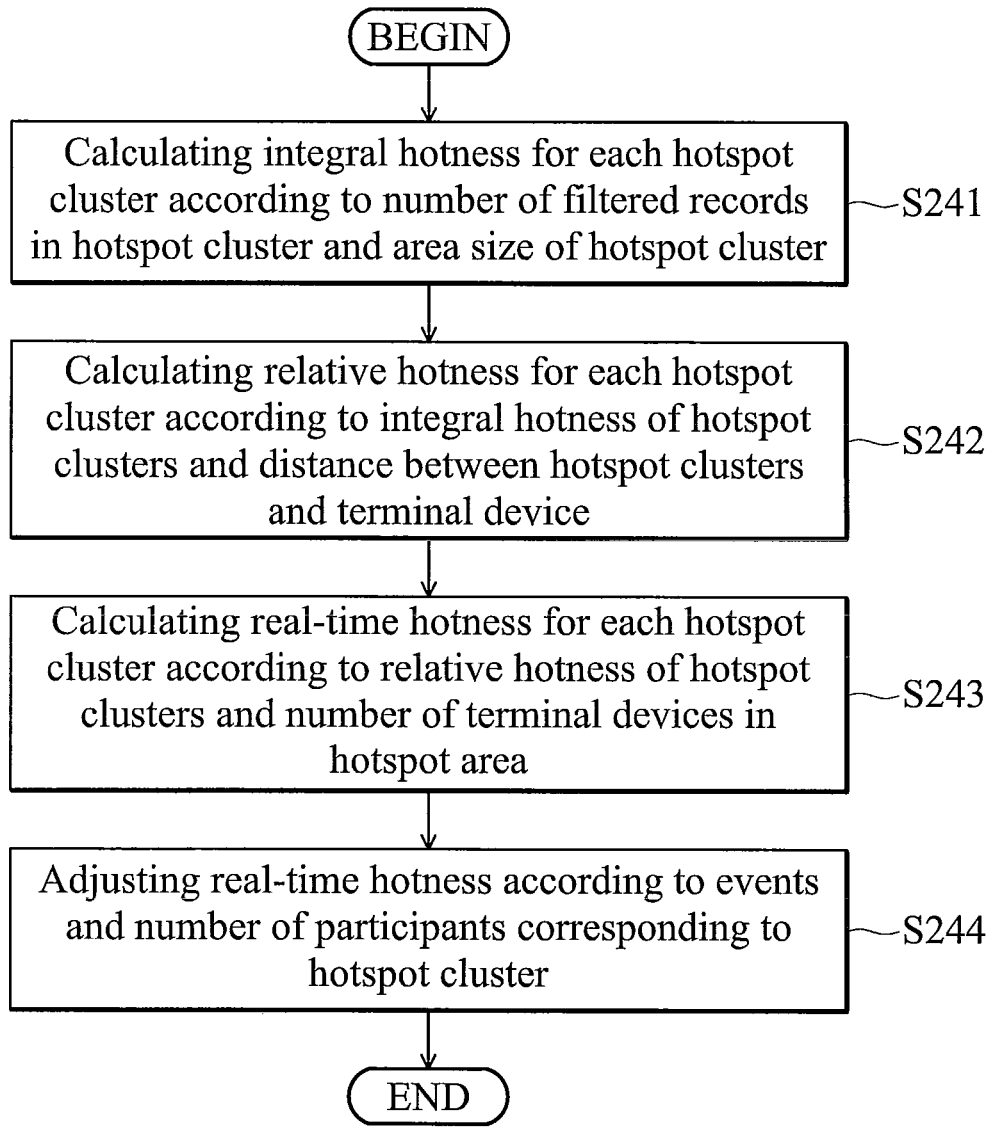
FIG. 5 is a flowchart of an embodiment of a hotness calculation method of the invention.

Referring to FIG. 2, in step S240, at least hotness is calculated for each hotspot cluster. It is noted that, in the application, the hotness may comprise integral hotness, relative hotness, and/or real-time hotness. FIG. 5 is a flowchart of an embodiment of a hotness calculation method of the invention. In step S241, the integral hotness is calculated for each hotspot cluster, according to the number of the filtered records in the hotspot cluster and the size of the hotspot area of the hotspot cluster, using the following equation:

$$\hat{S}_i = \eta_1 \times \frac{\text{num}_i}{\text{area}_i \times T}, \quad (1)$$

wherein $\hat{S}_i$ is the integral hotness of the hotspot cluster i; $\text{num}_i$ is the number of the filtered records in the hotspot cluster i; $\text{area}_i$ is the size of the hotspot area of the hotspot cluster i; T is the length of the specific time section; and $\eta_1$ is an adjustment coefficient, which can be adjusted according to various applications.

In step S242, the relative hotness is calculated for each hotspot cluster, according to the integral hotness of the respective hotspot clusters and a distance between the respective hotspot clusters and a terminal device (current position information), using the following equation:

$$S_{i,j} = \frac{\hat{S}_i}{1 + \text{dist}_{i,j}}, \quad (2)$$

wherein $S_{i,j}$ is the relative hotness of the hotspot cluster i to the terminal device j; and $\text{dist}_{i,j}$ is the distance between the hotspot cluster i and the terminal device j.

In step S243, the real-time hotness is calculated for each hotspot cluster, according to the relative hotness of the respective hotspot clusters, and a number of terminal devices in the hotspot area of the hotspot cluster, using the following equation:

$$S'_{i,j} = \frac{S_i}{1 + \text{dens}_i}, \quad (3)$$

wherein $S'_{i,j}$ is the real-time hotness of the hotspot cluster i to the terminal device j; and $\text{dens}_i$ is the number of the terminal devices in the hotspot area of the hotspot cluster i. It is understood that, the number of the terminal devices in the hotspot area of each hotspot cluster can be known according to the position of each terminal device, and the position of each terminal device can be known from the current context information transmitted from the respective terminal device.

As described, events and the number of corresponding participants corresponding to each hotspot cluster can be also used to calculate the real-time hotness. In some embodiments, the events can be retrieved from an Internet in advance or manually input. In some embodiments, the events can be input and received from the terminal device via the communication network. Each event may comprise time information, position information, and the number of corresponding participants. In step S244, the real-time hotness for each hotspot cluster is adjusted using the following equation:

$$S''_{i,j} = \frac{S_i}{1+\text{dens}_i} + \eta_2 \times \sum_{k=0}^{n} \frac{\text{event}_k}{\varepsilon_k}, \quad (4)$$

wherein $S''_{i,j}$ is the adjusted real-time hotness of the hotspot cluster i to the terminal device j; $\text{event}_k$ is the number of participants for event k; $\varepsilon_k$ is an error adjustment item for event k; n is the number of events; and $\eta_2$ is an adjustment coefficient, which can be adjusted according to various applications.

It is understood that, the events corresponding to the hotspot cluster means that the time information of the respective event must conform to the specific time section covering the filtered records, and the position information of the respective event is located in the hotspot area of the hotspot cluster.

It is understood that, the embodiment of FIG. 5 discloses the calculation of real-time hotness for each hotspot cluster. However, in some embodiments, the integral hotness, the relative hotness, and the real-time hotness can be calculated respectively for subsequent use.

After the hotness of each hotspot cluster is calculated, in step S250, at least hotspot area information is generated according to the hotness, such as the integral hotness, the relative hotness, and/or the real-time hotness of the respective hotspot clusters, and the hotspot areas of the respective hotspot clusters. In some embodiments, the hotspot clusters can be ranked according to the hotness, such as the integral hotness, the relative hotness, and/or the real-time hotness of the respective hotspot clusters, and a predefined number of the hotspot clusters with higher ranking are selected as recommended hotspot clusters. In some embodiments, the hotspot area information and/or the names of the recommended hotspot clusters can be transmitted to the terminal device via the communication network. It is noted that, in some embodiments, when the terminal device has an operational interface or a display unit, the hotspot area information and/or the names of the recommended hotspot clusters can be displayed in the operational interface or the display unit, and the hotspot clusters can be displayed in different colors according to the corresponding hotness.

Therefore, the hotspot analysis systems and methods can analyze the loading hotspots, and calculate the integral hotness, the relative hotness, and/or the real-time hotness for respective hotspot clusters, thus to assist users and/or taxis to make related decisions.

Hotspot analysis systems and methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A hotspot analysis system for use in an electronic device, comprising:
 a database comprising a plurality of records, each comprising context information having at least time information and position information;
 a filtering module filtering the records according to current context information to obtain a plurality of filtered records, wherein the current context information comprises current time information;
 a clustering module clustering the filtered records into at least one hotspot cluster according to the position information of the filtered records, and generating a hotspot area for each hotspot cluster;
 an analysis module calculating integral hotness for each hotspot cluster according to the number of the filtered records in the hotspot cluster and the size of the hotspot area of the hotspot cluster, and generating at least hotspot area information according to the integral hotness and the hotspot area of each hotspot cluster;
 a location model recording a semantic structure for location, wherein the semantic structure comprises a plurality of location units and related definitions thereof, and the connection relationships for location units, wherein the location units comprise any one of intersections, road sections, scenic spots, and landmarks; and
 a naming module naming the hotspot area corresponding to the hotspot cluster according to the location model,
 wherein the integral hotness is calculated according to the following formula:

$$\hat{S}_i = \eta_1 \times \frac{\text{num}_i}{\text{area}_i \times T}$$

wherein $\hat{S}_i$ is the integral hotness of a hotspot cluster i; $\text{num}_i$ is the number of the filtered records in the hotspot cluster i; $\text{area}_i$ is the size of a hotspot area of the hotspot cluster i; T is a length of a specific time section; and $\eta_1$ is an adjustment coefficient.

2. The system of claim 1, further comprising:
 a time model recording a semantic structure for time, wherein the semantic structure comprises a plurality of time sections, definitions of a beginning time point and an end time point for each time section, the sequence relationships among the respective time sections, and the coverage relationships among the respective time sections, wherein the filtering module retrieves a first specific time section from the time model according to the current time information and the time model, and filters the records in the database according to the first specific time section to obtain the filtered records.

3. The system of claim 2, wherein the filtering module further determines whether the number of the filtered records is less than a predefined number, and when the number of the filtered records is less than the predefined number, a second specific time section is retrieved from the time model according to the semantic structure and the first specific time section.

4. The system of claim 1, wherein the current context information further comprises current position information, and the clustering module further clusters the filtered records according to the distances from the current position information to the position information of the respective filtered records.

5. The system of claim 4, further comprising a time module and a positioning module respectively generating the current time information and the current position information of the current context information.

6. The system of claim 4, further comprising a movable device, and the movable device further comprises a positioning module to communicate with a positioning system via a communication network to generate position information of the movable device, wherein the position information of the movable device is the current position information of the current context information.

7. The system of claim 4, wherein the analysis module further calculates relative hotness for each hotspot cluster according to the integral hotness of the respective hotspot clusters and a distance between the respective hotspot clusters and the current position information, and generates the hotspot area information according to the relative hotness and the hotspot area of each hotspot cluster.

8. The system of claim 4, further comprising a plurality of movable devices, wherein each of the movable devices comprises a positioning module to communicate with a positioning system via a communication network to generate position information of the movable device, and the position information of a specific movable device is set as the current position information of the current context information,
wherein the analysis module further calculates relative hotness for each hotspot cluster according to the integral hotness of the respective hotspot clusters and a distance between the respective hotspot clusters and the current position information, and
the analysis module further calculates real-time hotness for each hotspot cluster according to the relative hotness of the respective hotspot clusters, and the number of the movable devices in the hotspot area of the hotspot cluster, and provides the hotspot area information according to the real-time hotness and the hotspot area of each hotspot cluster.

9. A hotspot analysis method for use in an electronic device, comprising:
providing a database comprising a plurality of records, wherein each record comprises context information having at least time information and position information;
obtaining current context information comprising current time information;
filtering the records according to current context information to obtain a plurality of filtered records;
clustering the filtered records into at least one hotspot cluster according to the position information of the filtered records, and generating a hotspot area for each hotspot cluster;
calculating integral hotness for each hotspot cluster according to the number of the filtered records in the hotspot cluster and the size of the hotspot area of the hotspot cluster;
generating at least hotspot area information according to the integral hotness and the hotspot area of each hotspot cluster;
providing a location model recording a semantic structure for location, wherein the semantic structure comprises a plurality of location units and related definitions thereof, and the connection relationships for location units, wherein the location units comprise any one of intersections, road sections, scenic spots, and landmarks; and
naming the hotspot area corresponding to the hotspot cluster according to the location model,
wherein the integral hotness is calculated according to the following formula:

$$\hat{S}_i = \eta_1 \times \frac{\text{num}_i}{\text{area}_i \times T}$$

wherein $\hat{S}_i$ is the integral hotness of a hotspot cluster i; $\text{num}_i$ is the number of the filtered records in the hotspot cluster i; $\text{area}_i$ is the size of a hotspot area of the hotspot cluster i; T is a length of a specific time section; and $\eta_1$ is an adjustment coefficient.

10. The method of claim 9, further comprising:
providing a time model recording a semantic structure for time, wherein the semantic structure comprises a plurality of time sections, definitions of a beginning time point and an end time point for each time section, the sequence relationships among the respective time sections, and the coverage relationships among the respective time sections;
retrieving a first specific time section from the time model according to the current time information and the time model; and
filtering the records according to the first specific time section to obtain the filtered records.

11. The method of claim 10, further comprising:
determining whether the number of the filtered records is less than a predefined number;
when the number of the filtered records is less than the predefined number, retrieving a second specific time section from the time model according to the semantic structures and the first specific time section; and
filtering the records in the database according to the second specific time section to obtain the filtered records,
wherein the time covered by the second specific time section is much longer than the time covered by the first specific time section.

12. The method of claim 9, wherein the current context information further comprises current position information, and the method further comprises a step of clustering the filtered records according to the distances from the current position information to the position information of the respective filtered records.

13. The method of claim 12, wherein the current time information and the current position information of the current context information is respectively generated by a time module and a positioning module of the electronic device.

14. The method of claim 12, further comprising communicating with a positioning system by a positioning module of a movable device to generate position information of the movable device, wherein the position information of the movable device is set as the current position information of the current context information.

15. The method of claim 12, further comprising:
calculating relative hotness for each hotspot cluster according to the integral hotness of the respective hotspot clusters and a distance between the respective hotspot clusters and the current position information; and
providing the hotspot area information according to the relative hotness and the hotspot area of each hotspot cluster.

16. The method of claim 12, further comprising:
receiving the current context information from a specific movable device among a plurality of movable devices, wherein each of the movable devices comprises a positioning module to communicate with a positioning system via a communication network to generate position information of the movable device, and the position information of the specific movable device is the current position information of the current context information;
calculating relative hotness for each hotspot cluster according to the integral hotness of the respective hotspot clusters and a distance between the respective hotspot clusters and the current position information;
calculating real-time hotness for each hotspot cluster according to the relative hotness of the respective hotspot clusters, and the number of the movable devices in the hotspot area of the hotspot cluster; and
generating the hotspot area information according to the real-time hotness and the hotspot area of each hotspot cluster.

17. A non-transitory machine-readable storage medium comprising a computer program, which, when executed, causes a device to perform a hotspot analysis method, and the method comprises:

obtaining current context information comprising current time information;
filtering a plurality of records according to the current context information to obtain a plurality of filtered records, wherein each record comprises context information having time information and position information;
clustering the filtered records into at least one hotspot cluster according to the position information of the filtered records, and generating a hotspot area for each hotspot cluster;
calculating integral hotness for each hotspot cluster according to the number of the filtered records in the hotspot cluster and the size of the hotspot area of the hotspot cluster;
generating at least hotspot area information according to the integral hotness and the hotspot area of each hotspot cluster;
providing a location model recording a semantic structure for location, wherein the semantic structure comprises a plurality of location units and related definitions thereof, and the connection relationships for location units, wherein the location units comprise any one of intersections, road sections, scenic spots, and landmarks; and
naming the hotspot area corresponding to the hotspot cluster according to the location model,
wherein the integral hotness is calculated according to the following formula:

$$\hat{S}_i = n_1 \times (\text{num}_i | (\text{area}_i \times T)$$

wherein $\hat{S}_i$ is the integral hotness of a hotspot cluster i; $\text{num}_i$ is the number of the filtered records in the hotspot cluster i; $\text{area}_i$ is the size of a hotspot area of the hotspot cluster i; T is a length of a specific time section; and $n_1$ is an adjustment coefficient.

* * * * *